United States Patent [19]
Bradus

[11] Patent Number: 4,628,233
[45] Date of Patent: Dec. 9, 1986

[54] MICROPROCESSOR BASED MOTOR CONTROL

[75] Inventor: Robert Bradus, Randallstown, Md.

[73] Assignee: Black & Decker Inc., Newark, Del.

[21] Appl. No.: 784,702

[22] Filed: Oct. 4, 1985

Related U.S. Application Data

[63] Continuation of Ser. No. 592,809, Mar. 23, 1984.

[51] Int. Cl.⁴ .................................................. H02P 7/28
[52] U.S. Cl. ..................................... 318/306; 318/434; 318/490; 318/569; 318/332
[58] Field of Search ............... 318/306, 307, 308, 311, 318/326, 327, 332, 334, 336, 430, 432, 433, 434, 436, 438, 466, 469, 474, 476, 563, 565, 566, 567, 568, 571, 611, 615, 685, 689, 696, 800, 799, 801, 802, 805, 811, 569, 490, 806, 439

[56] References Cited

U.S. PATENT DOCUMENTS

| | | | |
|---|---|---|---|
| 4,147,966 | 4/1979 | Kain et al. | 318/327 |
| 4,307,325 | 12/1981 | Saar | 318/334 |
| 4,417,189 | 11/1983 | Overfield | 318/696 |
| 4,513,381 | 4/1985 | Houser et al. | 318/345 E X |
| 4,550,277 | 10/1985 | Carney | 318/434 X |

Primary Examiner—William M. Shoop, Jr.
Assistant Examiner—Shik Luen Paul Ip
Attorney, Agent, or Firm—Harness, Dickey & Pierce

[57] ABSTRACT

A microprocessor based motor controller which provides open loop speed control at low conduction angles, closed loop speed control at high conduction angles, and a smooth transition between open loop and closed loop zones. In open loop, the motor speed is selected and is permitted to vary with applied load. In closed loop, the motor speed is held constant, substantially irrespective of load. In the transition zone, the motor is operated in a hybrid open loop, closed loop fashion.

Anti-kickback protection is also provided based on a percentage change in the motor's rotational period.

39 Claims, 5 Drawing Figures

MICROPROCESSOR BASED MOTOR CONTROL

This application is a continuation of application Ser. No. 592,809, filed Mar. 23, 1984.

BACKGROUND OF THE INVENTION

1. Field of the Invention

The present invention relates generally to power tools and electrical motor controllers for such tools. More particularly the invention relates to a microprocessor-based or microcomputer-based control circuit for monitoring and controlling various operating parameters of the tool.

2. Description of the Prior Art

In controlling the speed of an electric motor for use in power tools, it is now generally known to use gate electronic power controlling devices, such as a SCR's or triacs, for periodically transferring electrical energy to the motor. Many popular power tools employ universal motors which are readily controllable using such gate controlling devices.

Generally speaking, gated speed control circuits work by switching the motor current on and off at periodic intervals in relation to the zero crossing of the a.c. current or voltage waveform. These periodic intervals are caused to occur in synchronism with the a.c. waveform and are measured in terms of a conduction angle, measured as a number of degrees. The conduction angle determines the point within the a.c. waveform at which electrical energy is delivered to the motor. For example, a conduction angle of 180 degrees per half cycle corresponds to a condition of full condition, in which the entire, uninterrupted alternating current is applied to the motor. Similarly, a 90-degree conduction angle corresponds to developing the supply voltage across the motor commencing in the middle of a given half cycle and thus corresponds to the delivery of approximately half of the available energy to the motor. Conduction angles below 90 degrees correspond to the transfer of even lesser quantities of energy to the motor.

Motor speed control circuits of the prior art have employed gating devices to alter the conduction angle in order to deliver a predetermined amount of energy to the motor, and to thereby achieve a predetermined motor speed. With universal motors, which are commonly used in power tools, motor speed is also related to the load placed on the motor. That is, under no load the motor delivers one given speed (the no load speed) and under load, the motor speed decreases as the load increases. The inverse relationship between speed (R.P.M.) and load (torque) at various conduction angles for a given motor may be expressed graphically as a family of curves in a speed-torque diagram.

One scheme for controlling motor speed simply selects a desired no load speed by selecting the appropriate conduction angle. The speed control circuit is of an open loop configuration, which means that no speed sensing mechanism is used to provide a feedback signal for maintaining the desired speed as the load is varied. Thus the open loop motor speed control circuit is capable of providing a preselected no load speed, but has no mechanism for holding speed constant under a changing load. In open loop, the motor speed will diminish in accordance with the speed-torque relationship as a load is applied to the tool. In the hands of a skilled operator, the open loop configuration provides a tool in which the power demands, and potentially destructive overheating conditions, can be sensed by the decrease in motor speed. However, such configurations do not provide for constant speed operation.

In contrast to the open loop configuration, some motor speed control circuits are designed as a closed loop configuration. In a closed loop configuration means are provided for sensing either the rotational speed of the motor or the current drawn by the motor to provide a feedback signal indicative of actual motor speed. The feedback signal is compared with an operator selected desired speed to determine an error signal. The error signal is then used to speed up or slow down the motor so that a substantially constant rotational speed is achieved. While closed loop motor speed control configurations offer the ability to operate a motor at a relatively constant speed, to a large extent independent of the load placed on the motor, they are not without problems.

One significant problem with closed loop motor speed control is the potential for overheating the motor under heavy loads at low speeds. Present day power tools use cooling fans, driven by the motor armature for dissipating heat generated by the motor. Such cooling fans become gradually less efficient as motor speed diminishes, to the point where overheating can become a significant problem. In a closed loop configuration, a power tool can be quite readily overheated when a desired speed corresponding to an armature speed insufficient to develop efficient fan cooling (e.g. below 10,000 RPM) is selected. Specifically, if the power tool is placed under a heavy load, the motor speed control circuit will increase the conduction angle, as the load on the motor is increased, in an effort to maintain a constant speed. This causes increasingly higher currents to flow through the windings of the motor with a dramatic rise in temperature. Without adequate fan cooling the tool quickly overheats which may cause permanent damage to the tool's lubricant-impregnated bearings or other components. Even in the hands of a skilled operator, it may not be readily apparent that an overheating condition is taking place until it is too late. The constant low operating speed can give a false impression that little power is being delivered to the motor, even when the power is in fact quite high due to the operation of the closed loop speed control circuit. In this state, overheating and damage can occur quite rapidly. Thermal protection circuits and over current protection circuits are known for combating the overheating problem, however, in order to fully protect against overheating, the sensitivity of these circuits must be high and thus quite often will falsely trigger a motor shut down when the operator is only momentarily overloading the tool, without any danger of permanent damage to the tool.

Another feature which is present in more sophisticated motor speed control circuits is an anti-kickback feature for removing power from the tool when an imminent kickback situation is detected. Generally, the kickback condition corresponds to a very rapid change in load, such as might occur when the tool grabs or seizes in a work piece, causing a backward thrust of the work piece or tool. Kickback problems are most significant with power tools which develop high torque. Several anti-kickback detection schemes have been proposed. One such anti-kickback scheme involves monitoring the rate of change in motor current, while another scheme involves monitoring the rate of change of motor speed. An example of a system which employs a rate of change of motor current detection scheme may be found in U.S. Pat. No. 4,249,117, to Leukhardt, issued Feb. 3, 1981. An example of a rate of change of motor speed detection scheme may be found in U.S. Pat. No. 4,267,914, to Saar, issued May 19, 1981. Both of the above noted patents are assigned to the assignee of the present invention.

While both kickback detection schemes have proven useful, it has heretofore been difficult to adapt such schemes to a wide range of operating speeds. In order to have sufficient sensitivity at higher operating speeds, the kickback sensing circuitry of the prior art may produce false kickback detections at lower operating speeds. Moreover, it has not heretofore been possible to readily adapt one kickback detecting scheme to a wide variety of power tools. In this regard, heavy duty half-inch drills, for example, have a high gear ratio and generate a lot of torque. For such drills a high kickback sensitivity is desirable. However, for quarter-inch drills, have a relatively low gear ratio and do not generate a lot of torque, rapid speed variations with change in loads are common and therefore the kickback sensitivity should be low. Prior art kickback detection schemes are not readily adaptable to different sensitivity settings for use with such broad ranges of tools.

SUMMARY OF THE INVENTION

The present invention in general provides a microprocessor-based or microcomputer-based control circuit which affords the advantages of both open loop and closed loop motor speed control configurations, while eliminating the problems associated with these configurations. In addition, the invention provides an anti-kickback system which reacts to the percentage change in motor speed to provide sufficient sensitivity at high speeds without being overly sensitive at low speeds. The anti-kickback system is readily adaptable to different sensitivity settings for use with a broad range of power tools.

In accordance with the invention control apparatus is provided and a method is disclosed for controlling a motor operable over a range of conduction angles. The speed-torque operating characteristics of the motor are divided or segregated into various operating zones in order to effect a combination open loop/closed loop configuration. A first operating zone is defined, corresponding to conduction angles below a predetermined first angle. A second operating zone is defined, corresponding to conduction angles between the first conduction angle and a predetermined second conduction angle greater than the first angle. A third operating zone is defined, corresponding to conduction angles greater than the second conduction angle. In accordance with the inventive method, one of the above operating zones is selected, and based upon the zone selected the following steps are performed.

If the first zone is selected, the motor is operated in an open loop configuration.

If the second zone is selected, the motor is operated in a hybrid configuration whereby the conduction angle is varied in relation to the load to maintain a predetermined constant speed, so long as the required conduction angle does not exceed the selected conduction angle. In other words, the motor is operated in a limited closed loop fashion for selected conduction angles below the predetermined second angle. As loads continue to increase, however, the motor speed is not held constant, but rather is permitted to decrease in accordance with the characteristic speed-torque relationship of the motor.

If the third zone is selected, the motor is operated in a closed loop configuration. In the third zone the conduction angle selected is interpreted as a desired operating speed, and the motor is operated at that desired speed until the power capability of the motor is reached.

Selection of one of the operating zones is made by the operator of the tool (through the use of a manually operable trigger or the like) by providing an analog signal corresponding to a selected conduction angle. In the first operating zone the selected conduction angle is less than the first conduction angle and the motor is operated at the selected conduction angle, which remains constant, while the speed of the motor is allowed to vary in accordance with the load applied. In the second zone the selected conduction angle is less than the second conduction angle and greater than the first conduction angle, and the motor is operated at a predetermined rotational speed corresponding essentially to the no load operating speed of the motor at the first conduction angle. In this second zone, the conduction angle is automatically increased or decreased to maintain the predetermined speed, so long as the required conduction angle does not exceed the selected conduction angle. If the load is increased to the point where the conduction angle reaches the selected conduction angle, the conduction angle is held at the selected conduction angle and motor speed is permitted to thereafter decrease with further increases in load. In the third zone the selected conduction angle is greater than the second conduction angle and is interpreted as a desired speed instruction. This desired speed is held constant while the conduction angle is permitted to vary as required to maintain the contant speed.

The present method and apparatus disclosed further provides for the detection of an impending kickback condition by determining a first value indicative of the roational period of the motor during a first time interval. A first limit value is determined based upon a percentage of the first value. A second value, indicative of the rotational period of the motor during a second time interval, is then determined. If the second value exceeds the first value by at least the first limit value, a predetermined response is produced. More specifically, the first limit value is added to the first value to produce a first test value, and the first test value is compared with the second value. If the second value exceeds the first test value the predetermined response is produced. The predetermined response typically includes removing or interrupting the delivery of power to the motor, and may further include initiating a brake routine to decrease the rotational speed of the motor. In addition, the present invention includes a safety provision whereby once power is interrupted during the anti-kickback routine, it remains interrupted until an instruction from the operator is received. This instruction may be, for example, a resetting action taken by releasing the manually operable trigger to its off position.

For a further understanding of the invention, as well as its objects and advantages over prior art motor controllers, reference is made to the following specification and to the accompanying drawings and flow charts.

DESCRIPTION OF THE PREFERRED EMBODIMENT

Figure 1:
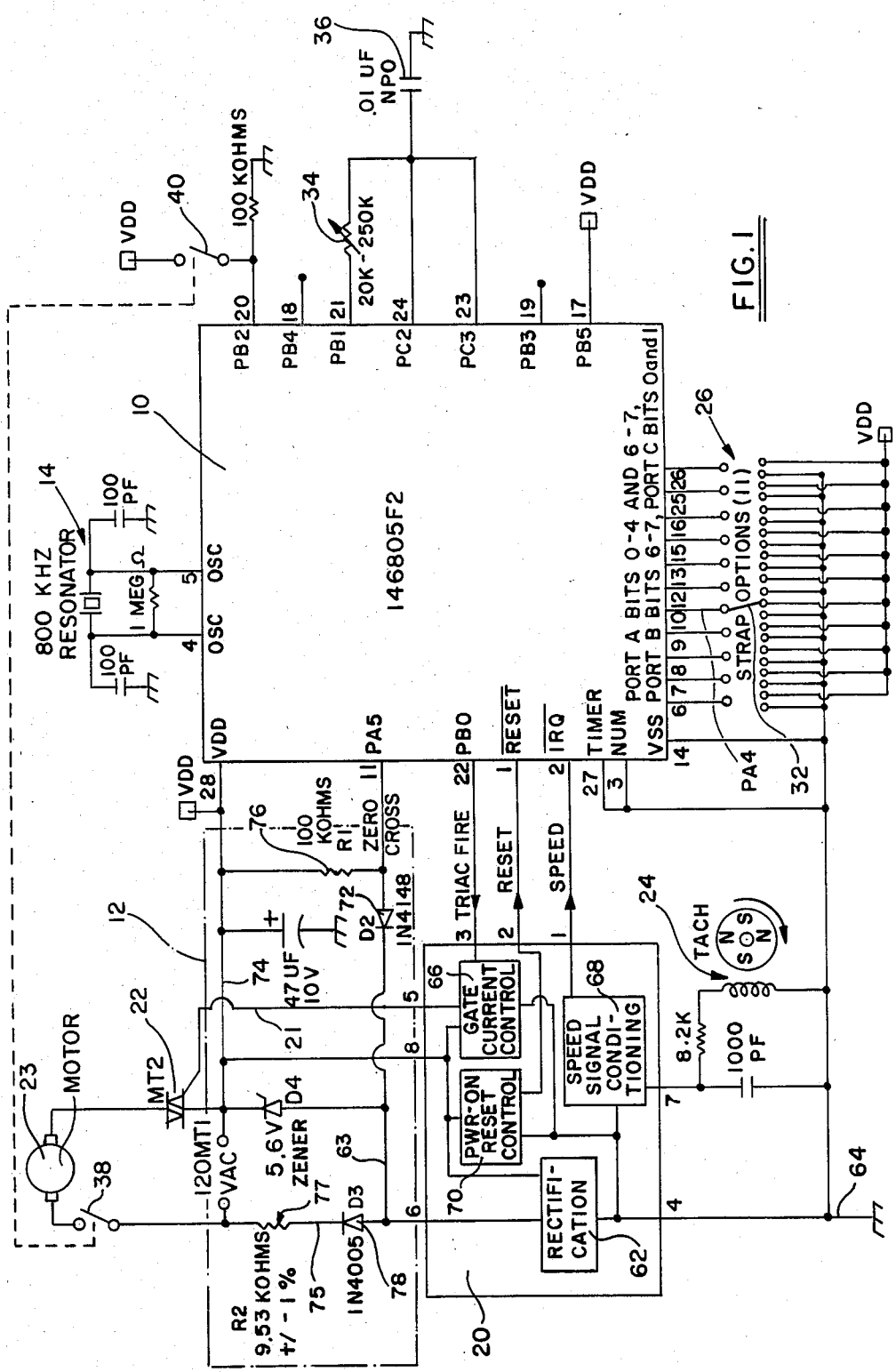
FIG. 1 is a schematic circuit diagram of the microcomputer-based control circuit of the present invention.

Referring to FIG. 1, a circuit diagram of the electronic control circuit of the present invention is shown. The control circuit comprises microcomputer 10, which in the preferred embodiment is an MC146805F2 single chip, 8-bit microcomputer unit (MCU), containing an on-chip oscillator, CPU, RAM, ROM, I/O, and TIMER. Although the preferred embodiment described herein discloses a microcomputer implementation, it is to be understood that the teachings of the present invention may also be implemented utilizing other forms of digital circuitry, such as discrete digital logic integrated circuits.

The microcomputer 10 receives power through a power supply circuit 12, which converts the 115 volt to 120 volt a.c. input signal to +5 volt DC signal. An 800 KHz. resonator 14 is coupled to the oscillator terminals (pins 4 and 5) to provide a stable clock for operating the microcomputer 10.

Microcomputer 10 is provided with a first group of eight input/output lines comprising port A and a second group of eight input/output lines comprising port B. In addition, microcomputer 10 includes a third group of four lines comprising port C. The state of each line comprising port A and port B is software programmable. Port C is a fixed input port. In FIG. 1 the lines comprising ports A, B and C are identified by the alpha numeric designation PA5, PB0, PC2, and so forth, wherein the number refers to the binary line number (0-7) and the letter (A, B, or C) is the port designation.

Microcomputer 10 also includes a reset terminal, designated RESET, a maskable interrupt request terminal, designated IRQ, as well as the usual power supply connection terminals $V_{DD}$, and $V_{SS}$. The terminals designated TIMER and NUM are tied to $V_{SS}$, which is a floating ground.

The invention further comprises a signal processing circuit 20 which provides the functions of rectification, power on reset control, gate current control, and speed signal conditioning. Signal processing circuit 20, which is described more fully below, provides a speed signal to the interrupt request line IRQ of microcomputer 10. Signal processing circuit 20 also provides a reset signal to the RESET terminal of microcomputer 10. In turn, signal processing circuit 20 receives a triac fire signal from microcomputer 10. In response to the triac fire signal, circuit 20 provides a gating signal on lead 21 to the triac device 22 which controls the flow of power to motor 23. A tachometer, or equivalent motor speed sensing device is positioned to determine the rotational speed or rotational period of the armature of motor 23.

Tachometer 24 produces a sinusoidal signal the frequency of which is indicative of the rotational speed or rotational period of the motor 23. This signal is provided to signal processing circuit 20 which conditions the signal and applies it to the interrupt request terminal IRQ for further processing by microcomputer 10 as discussed below.

Signal processing circuit 20 includes a rectification circuit 62 coupled between node 63 and floating ground 64. Rectification circuit 62 may be implemented with a diode poled to conduct current in a direction from ground 64 to node 63, thereby placing node 63 substantially at (or at least one diode drop below) floating ground potential. Signal processing circuit 20 further includes a gate control circuit 66, preferably comprising a current switch, for supplying a current signal for firing triac 22 in response to the triac fire signal from microcomputer 10. Gate control circuit 66 thereby isolates microcomputer 10 from triac 22 while supplying the necessary current for triggering the triac. Signal processing circuit 20 further includes a speed signal conditioning circuit 68 such as a Schmitt trigger comparator circuit for supplying fast rise and fall time pulses to microcomputer 10 in response to the comparatively slow rise and fall time sinusoidal signal output of tachometer 24. Signal processing circuit 20 also provides a power on reset control circuit 70 which is coupled to the $V_{DD}$ terminal of power supply 12 to provide a reset signal to microcomputer 10 upon initial power up.

Included within power supply 12 is a diode 72 which is coupled to terminal PA5 of microcomputer 10 to provide a zero crossing detection signal. When line 74 of supply 12 is positive with respect to the opposite side of the a.c. supply line, current flows through resistors 76 and 77 and diode 78. Node 63 is thus at one diode drop below floating ground potential, and terminal PA5 assumes a logical LO state. When line 75 goes positive during the next half cycle, diodes 72 and 78 block current flow. Hence there is no voltage drop across resistor 76 and terminal PA5 is at $V_{DD}$ potential to assume a logical HI state. It will be seen that terminal PA5 is thus toggled between alternating LO and HI states in synchronism with each half cycle of the a.c. waveform and may thus be used to determined when each zero crossing occurs.

The present invention provides a motor speed controlling device which may be utilized with a number of different types and sizes of motors in a wide range of different power tool applications. In order to preset the operating characteristics of the circuit to correspond to predetermined operating parameters or to a predetermined power tool, an option strap arrangement, designated generally by reference numeral 26, is provided. Certain of the lines of port A, port B and port C may be connected to a logical LO voltage or a logical HI voltage to convey a predetermined desired operating characteristic or characteristics to microcomputer 10. For example, in FIG. 1 a strap 32 is shown connecting PA4 to place a logical HI signal on the fourth bit of port A. It will be appreciated, that the particular arrangement of strap options, and the way in which microcomputer 10 interprets the bit patterns entered by the strap options will depend on the software, as those skilled in the art will recognize. In general, the strap option selections can be effected by any convenient means including the use of jumper wires or switches, or by selecting a printed circuit board with the appropriate traces being open or closed circuited.

The invention further comprises a means for producing an analog signal indicative of a desired operating characteristic of the motor, which in practice is selected by the operator during operation of the tool. Frequently, the desired operating parameter represents a desired motor speed, or a desired triac firing angle, or the like, and is inputted using a manually operable trigger. Although many different systems may be devised for providing instructions to the control circuit in accordance with the wishes of the operator, the presently preferred embodiment employs rheostat 34 as a trigger position transducer. Rheostat 34 is in series with capacitor 36, which is in turn coupled to ground. By appropriately setting the input/output line PB1, capacitor 36 is alternately charged and discharged through rheostat 34. The charging time is proportional to the resistance of rheostat 34, which may be varied in accordance with the manually operable trigger setting. Thus, the charging and discharging time is indicative of the position of the trigger. By appropriate selection of capacitor 36, rheostat 34 and software timing, as will be discussed below, an analog signal indicative of a desired operating parameter may be determined in accordance with a trigger position. This analog signal may then be converted to a digital signal for use in microcomputer 10.

While the foregoing represents one way of inputting the desired operating parameter, or selection of a desired speed for example, other mechanisms may be employed without departing from the scope of the invention. In general, a wide variety of digital or analog transducers may be employed, with the appropriate interface circuitry (such as A to D converters, for example) for communicating with microcomputer 10.

Figure 2:
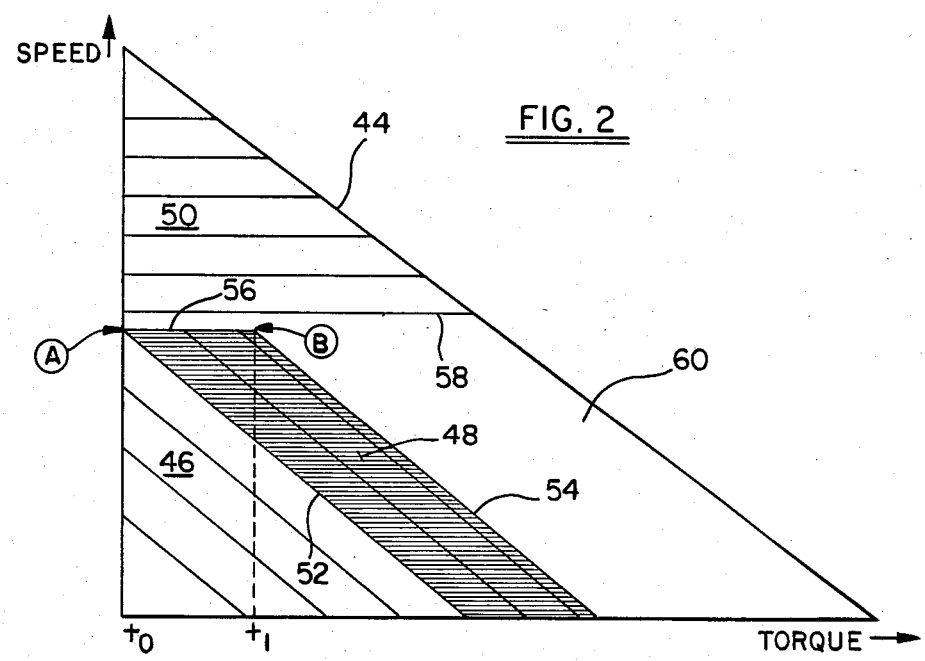
FIG. 2 is a graph of the speed vs. torque curves for a motor controlled in accordance with the present invention, illustrating the various operating zones of the invention.
Figure 3:
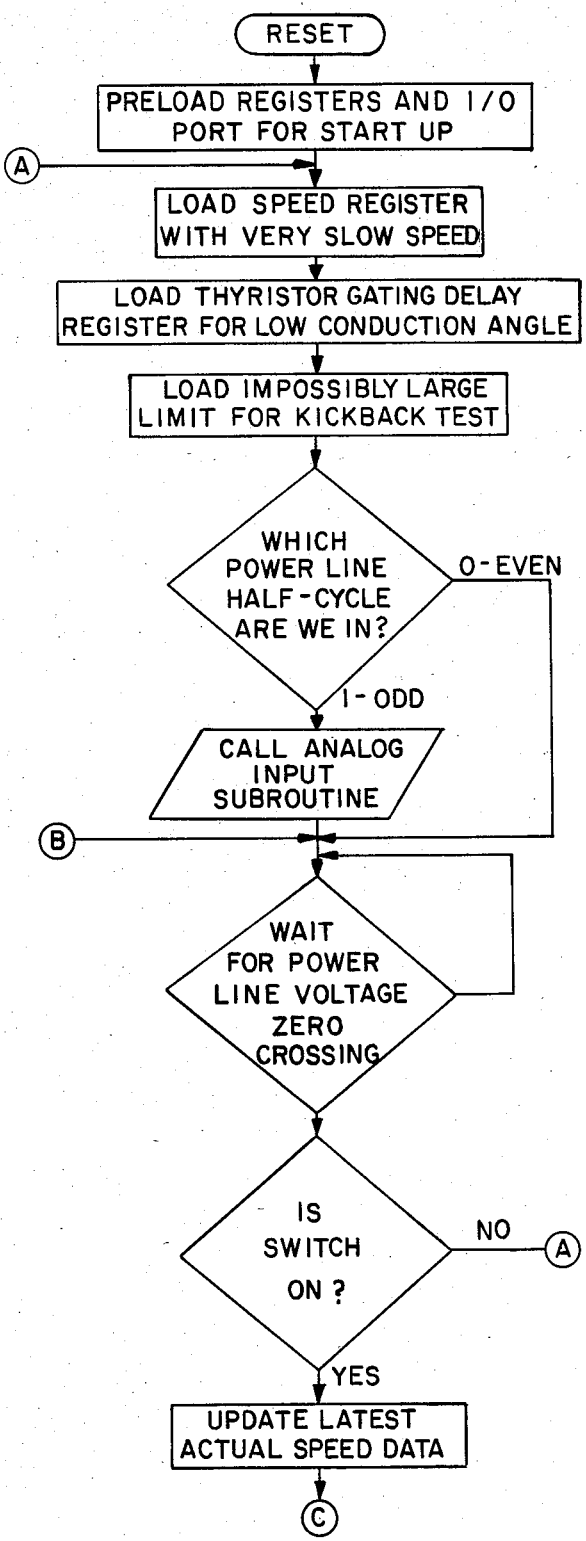
FIG. 3 is a flow chart illustrating the steps for implementing the combinational open loop/closed loop method of controlling a motor in accordance with the invention.
Figure 3:
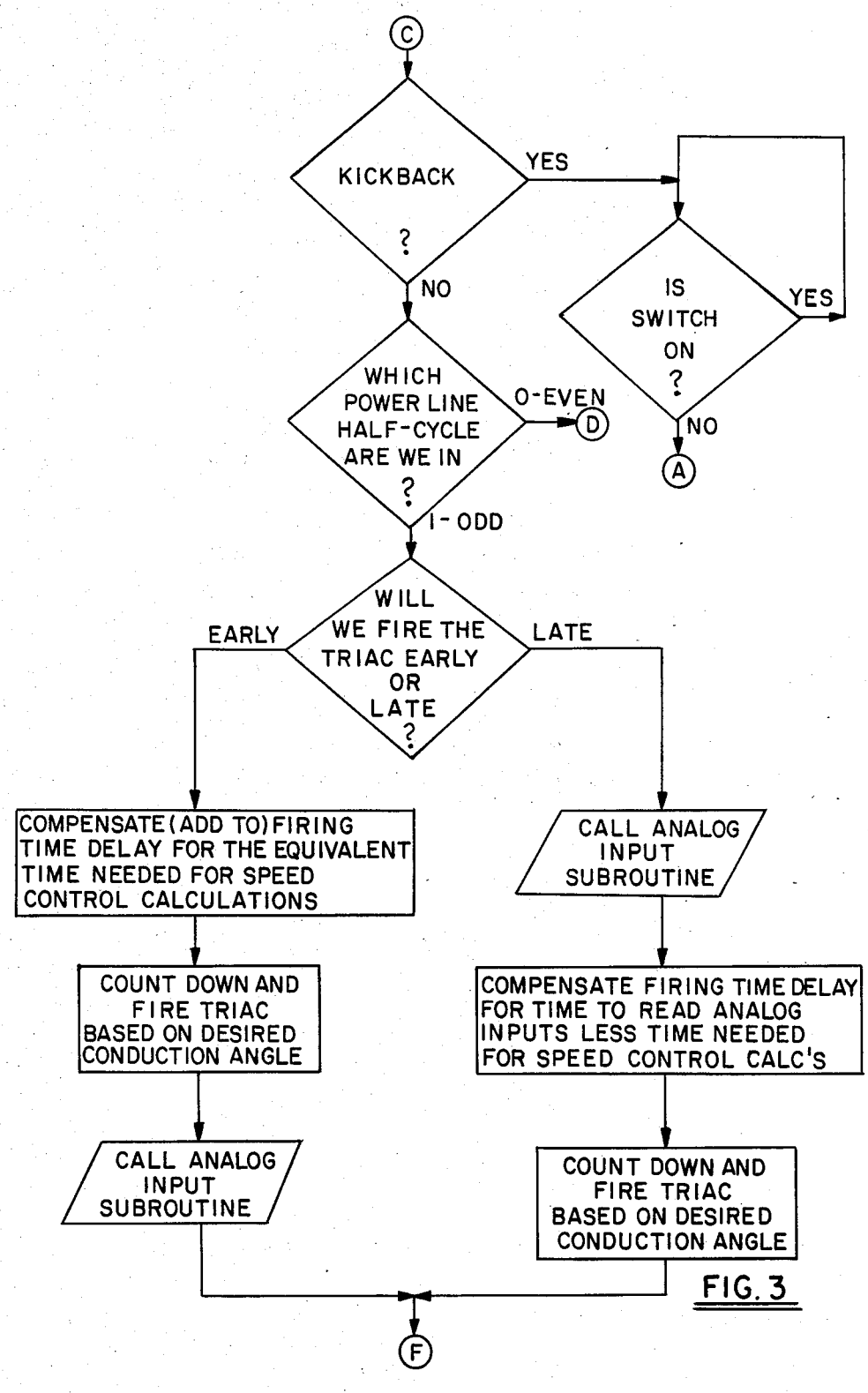
Figure 3:
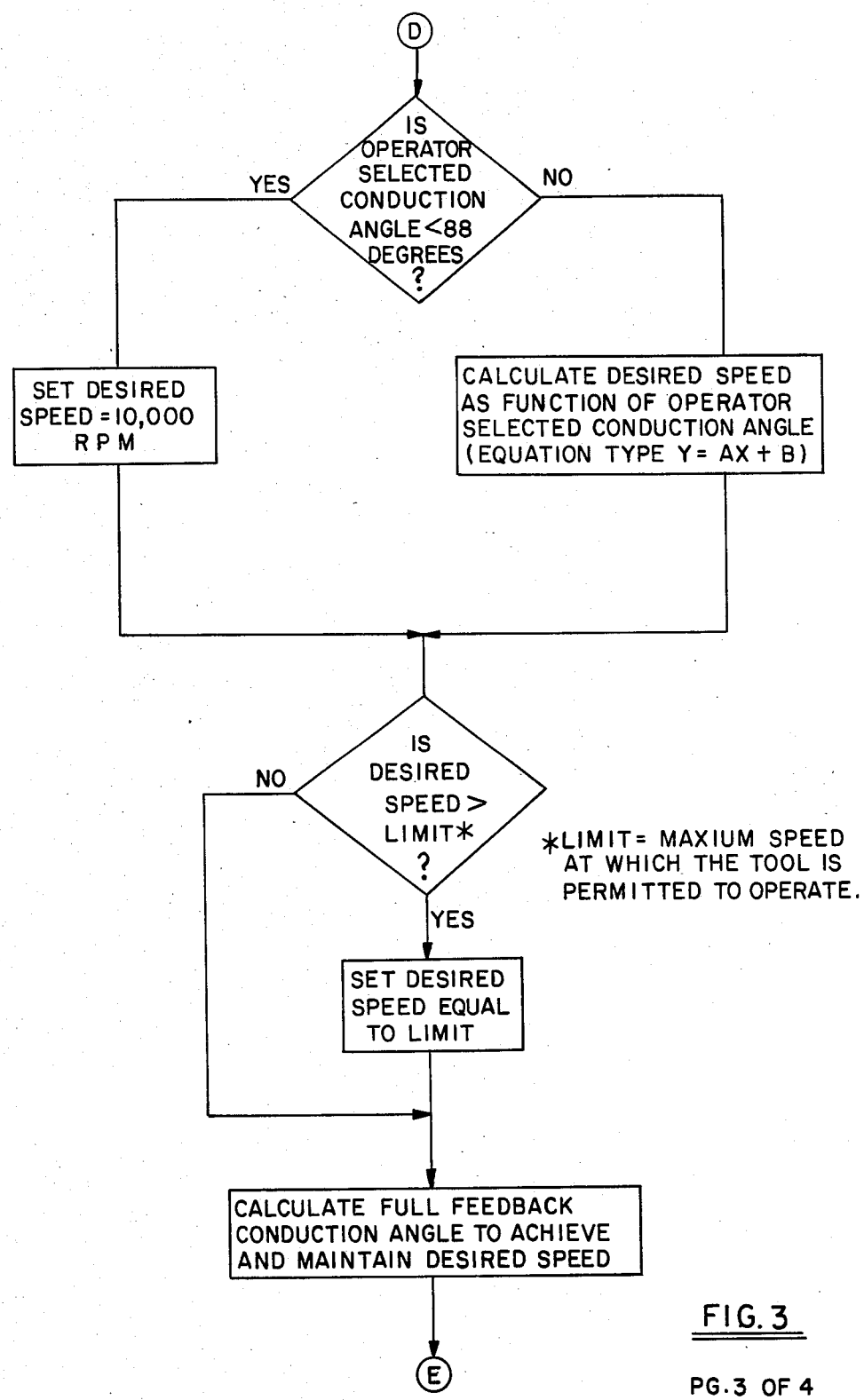
Figure 3:
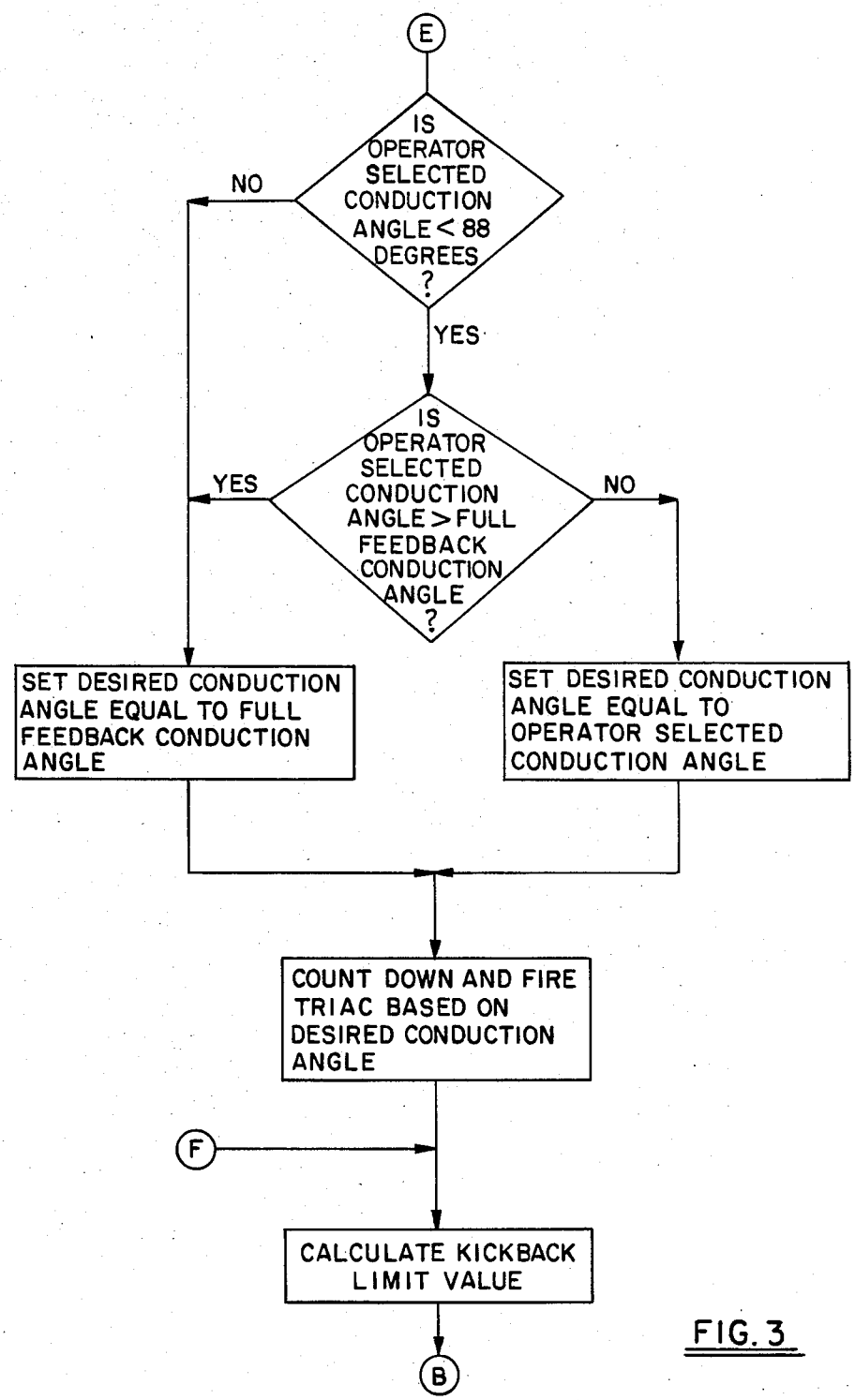
Figure 4:
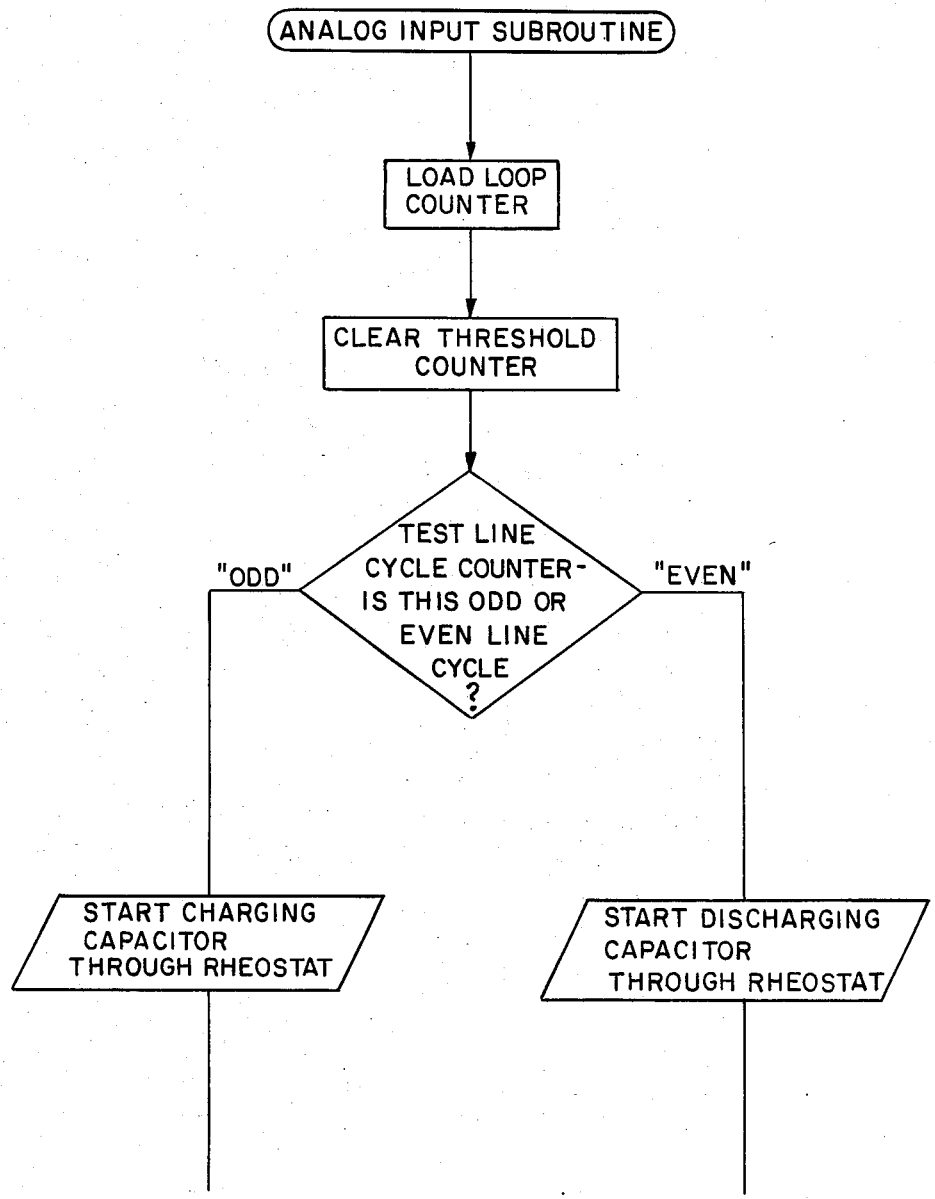
FIG. 4 is a flow chart diagram illustrating a preferred method of obtaining an analog signal indicative of a desired operating parameter, useful in implementing the invention.
Figure 4:
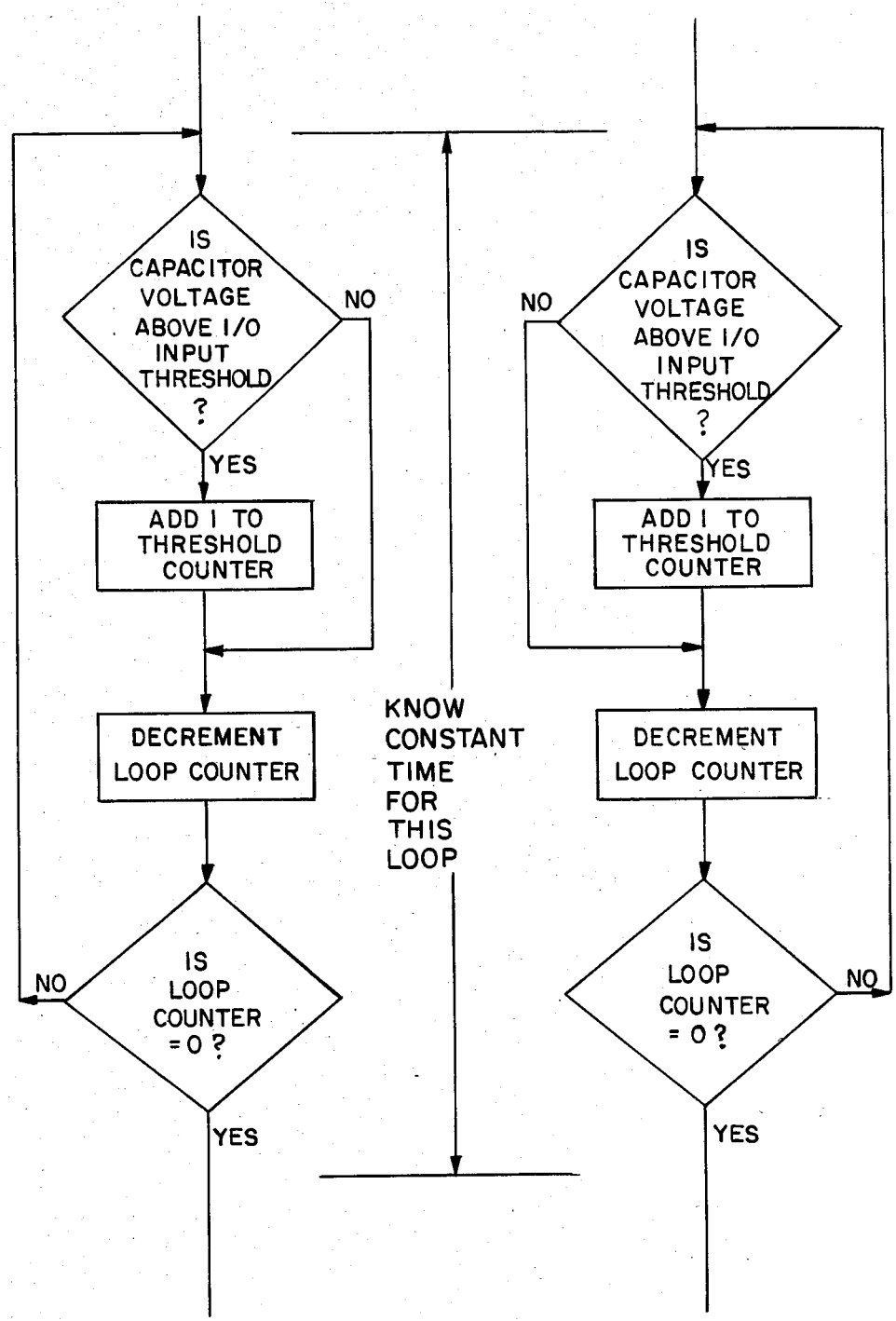
Figure 4:
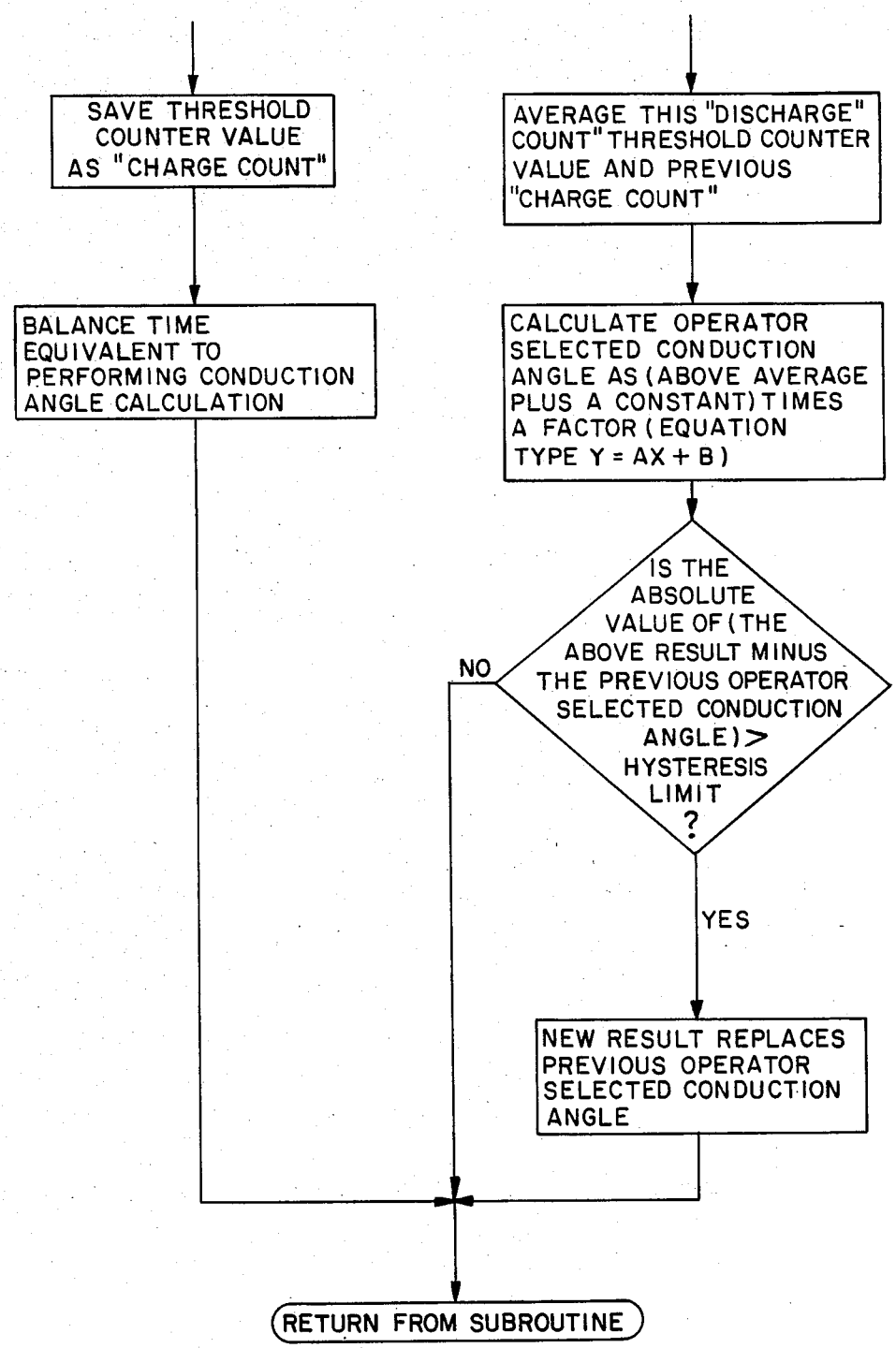
Figure 5:
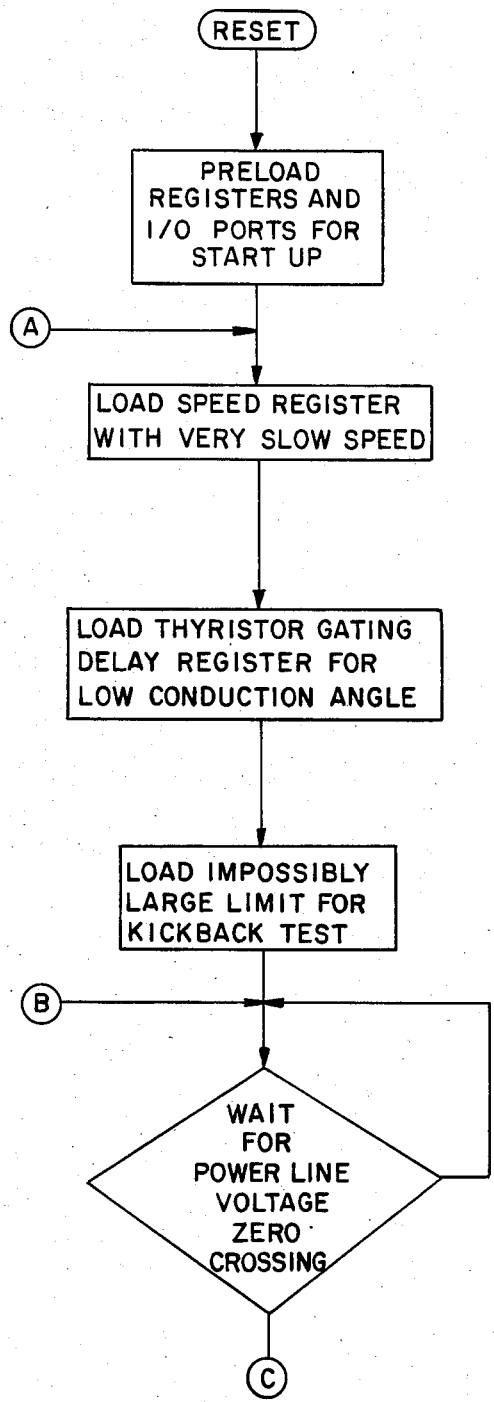
FIG. 5 is a flow chart diagram illustrating the anti-kickback detection and response producing method of the invention.
Figure 5:
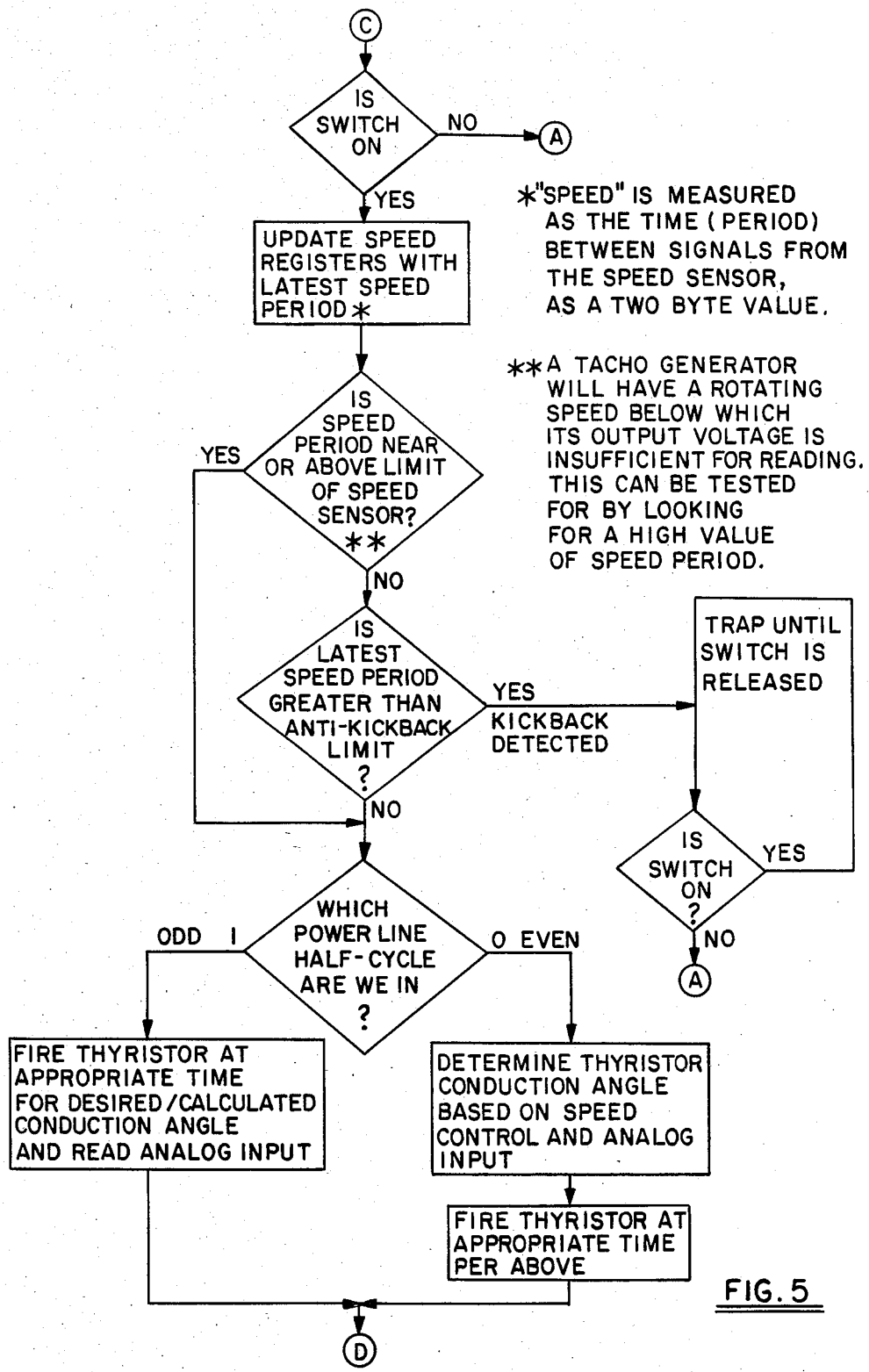
Figure 5:
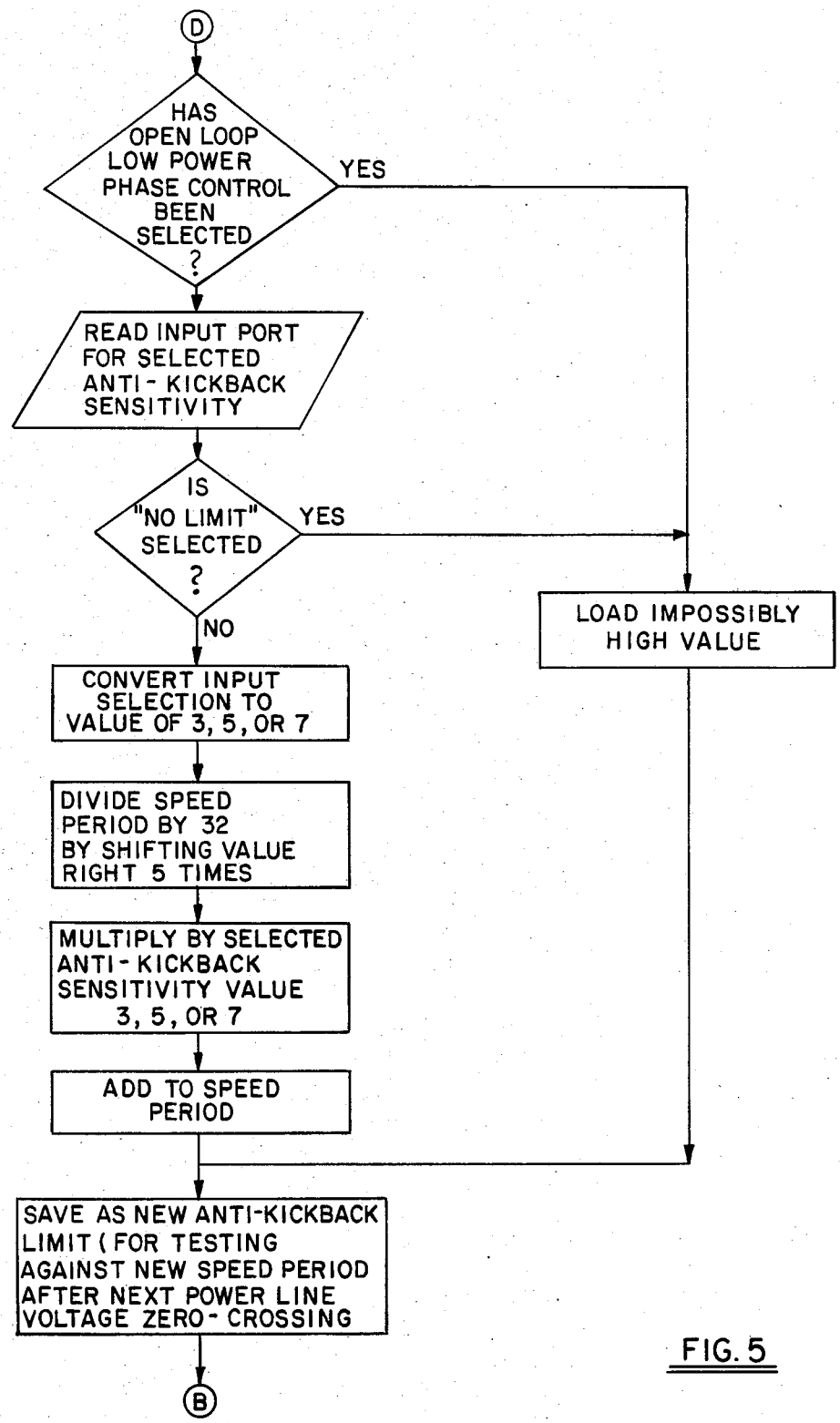

With the foregoing circuit in mind, reference is now made to the flow charts of FIGS. 3 through 5 and to the graph of FIG. 2 for a further understanding of the invention and its operation in accordance with the inventive method.

With reference to FIG. 2, the speed vs. torque curves for the motor at various conduction angles are shown. The uppermost diagonal line 44 represents full conduction (180 degrees). The area under the curves is divided into three operating ranges or zones, namely, first zone 46, second zone 48 and third zone 50. More specifically, first zone 46 is bounded from above by diagonal line 52, which corresponds to a conduction angle of aproximately seventy degrees. Second zone 48 is bounded between diagonal line 52 and diagonal line 54, which represents a conduction angle of approximately eighty-eight degrees. Second zone 48 is further bounded by horizontal line 56 which corresponds to a constant speed of 10,000 RPM. As seen in FIG. 2, horizontal line 56 intercepts the speed axis at point A and intercepts diagonal line 54 at point B. The third zone 50 is bounded from above by the uppermost diagonal line 44 and from below by horizontal line 58, which corresponds to a motor speed in excess of 10,000 RPM.

The area 60 which falls outside of the above-described three zones represents low speed high torque operating conditions which have been found to give rise to the potential for unwanted overheating conditions. More specifically, the factors which control the temperature of the motor are the current drawn by the motor and the means provided for dissipating the heat generated by the motor. In most power tools, a cooling fan is provided which is driven directly off the armature of the motor. Accordingly, at low speeds and heavy loads the cooling effect contributed by the fan may not be sufficient to prevent overheating. The area 60 in FIG. 2 represents the potentially dangerous overheating zone in which the cooling effect contributed by the fan is insufficient to overcome the thermal heating effects caused by heavy current draw at high torques.

Unlike prior art overload protection schemes, which have sought merely to detect overheating conditions so that the motor can be shut down before damage occurs, the present invention additionally seeks to avoid significant temperature rise by substantially preventing the motor from operating in the region which gives rise to the most significant overheating problems. As will be explained more fully below, the present invention permits the tool to be operated in any one of the above described three zones 46, 48 and 50, while carefully avoiding conditions which would fall in the danger zone 60.

The present invention utilizes the above described three operating zones to provide a combinational open loop/closed loop configuration. In the first zone 46 the motor is operated in an open loop configuration, whereby motor speed and torque are inversely related as illustrated by the diagonal line speed torque curves within first zone 46. Each of the diagonal line curves of first zone 46 represents an individual, operator selected conduction angle. Thus, for example, if the operator selects a conduction angle of less than approximately seventy degrees via the position of the trigger switch, the speed of the motor will be determined solely in accordance with the load applied thereto.

In the second zone 48 the motor is operated in a combinational open loop/closed loop configuration. In particular, for operator selected conduction angles between approximately seventy degrees (point A) and approximately eighty-eight degrees (point B) the control circuit is designed to provide a nominal operating speed of 10,000 RPM, regardless of the specific conduction angle between seventy and eighty-eight degree selected. Moreover, as the motor is loaded above no load torque $t_O$, the control circuit will operate initially in a closed loop mode and attempt to maintain motor speed at 10,000 RPM by increasing the conduction angle out to the operator selected conduction angle. However, if the operator selected conduction angle is not sufficient to maintain motor speed at 10,000 RPM given the loading on the motor, the speed of the motor will thereafter be permitted to decline in open loop fashion. Thus for example, if an eighty-eight degree conduction angle is selected and an increasing load is placed on the motor, the motor speed will initially be held constant at 10,000 RPM as the conduction angle is increased from the no load conduction angle of seventy degrees, following horizontal line 56, until point B is reached (corresponding to torque load $t_1$). As load increases beyond this point, the motor speed begins to decline, following diagonal line 54, which corresponds to the open loop speed vs. torque curve for an 88-degree conduction angle.

In the third zone 50 the operator selected conduction angle is interpreted as a desired speed request. Thus, conduction angles falling within the third operating zone each corresponds, in a one to one relationship with a desired operating speed. The speed control circuit will endeavor to maintain this constant speed by increasing or decreasing the conduction angle in accordance with the load until full conduction is reached. Full conduction (180 degrees), denoted by the uppermost diagonal line 44, represents the maximum power which can be delivered by the motor. If the motor is operating in the third zone 50 at full conduction, then any further increase in load upon the motor will cause the motor speed to drop following line 44.

The presently preferred embodiment for implementing this combinational open loop/closed loop configuration uses microcomputer 10 which is programmed to execute the algorithms described below. However, it will be understood that the particular algorithms described, while presently preferred, do not exhaust all possible algorithms for implementing the three zone speed control method or the combinational open loop/closed loop configuration in accordance with the invention. Accordingly, changes in the following algorithms may be made by those skilled in the art without departing from the scope of the invention as defined by the appended claims.

With reference to FIG. 3, the presently preferred algorithm for implementing the combinational open loop/closed loop speed mode is described fully in the flow chart. Following the system reset, the input/output ports are interrogated to preload the desired operating parameters for the particular tool in which the invention is employed. Next, initial low speed, low conduction angle and high kickback test limits are loaded to standardize the initial start-up conditions to safe values. After the initial values are set, the a.c. waveform is interrogated to determine the present half cycle, and if appropriate, the desired operator selected parameter is input by calling the analog input subroutine, which will be discussed below in connection with FIG. 4. In general, the analog input subroutine interrogates the manually operable trigger or other rheostat and provides a digital value representing the operator selected conduction angle. The program then waits for a power line zero crossing to synchronize the software timing with the a.c. waveform, and, provided the trigger switch has actually been depressed, the actual motor speed is determined or measured by tachometer 24. This actual motor speed (or motor rotational period) is loaded into a memory cell for containing the latest actual speed data.

Next, the kickback detection algorithm, discussed more fully with reference to FIG. 5, tests whether an impending kickback condition exists. If it does, then evasive measures are taken; if if does not, then the program determines whether the power line half cycle is even or odd. In the even half cycle, operation branches to a portion of the program which determines the desired speed based upon the operator-selected conduction angle. In the odd half cycle the program branches around the speed detemining algorithm, and instead executes a countdown procedure to fire triac 22 at the appropriate time, based on the desired conduction angle. More specifically, the countdown sequence includes a procedure for testing whether the triac will be fired early or late in the cycle. In general, this is done to compensate or balance the time required for making speed control calculations and for executing the analog input subroutine. If the triac is to fire early in the half cycle, a compensation value is added to the firing time to compensate for the amount of time required to perform a speed control calculation. Then the countdown sequence is initiated and the triac fired, followed by a call to the analog input subroutine. If the triac is to fire late in the half cycle, the analog input subroutine is executed early, and following that subroutine, the firing time value is compensated to reflect the amount of time spent performing the analog input subroutine, less the amount of time required for the speed control calculation. Finally the countdown sequence is executed and the triac fired.

To continue with the flow chart of FIG. 3, assume that operation is in the even half cycle, so that control has branched to the speed control computation algorithm beginning at point D. The algorithm next tests to determine whether the operator selected conduction angle is less than 88 degrees. If it is less than 88 degrees, the desired speed is set automatically at 10,000 RPM. In the alternative, if the operator selected conduction angle is greater than 88 degrees, the selected conduction angle is converted again to a desired operator selected speed. This calculation is based upon a straight line approximation using an equation of the type $y=ax+b$, where "y" denotes speed, "x" denotes the operator selected conduction angle, and "a" and "b" denote constants which are preselected so that when "x" equals 88 degrees, "y" equals 10,000 and when "x" equals 180 degrees, "y" equals the maximum safe operating speed for the tool.

Once the desired speed has been determined, the circuit next tests to determine whether the desired speed exceeds a predetermined maximum speed limit established for the tool. Assuming the desired speed is below the maximum speed limit, a calculation is then performed to determine the appropriate conduction angle necessary to achieve and maintain the desired speed. If the operator selected conduction angle is less than 88 degrees, the circuit determines whether the operator selected conduction angle is greater than the full feedback conduction angle required to maintain the desired speed. If the operator selected conduction angle is greater than the full feedback conduction angle, the circuit sets the desired conduction angle equal to the full feedback conduction angle and a degree of closed loop control is effected. If, however, the operator selected conduction angle is not greater than the full feedback conduction angle, the desired conduction angle is set equal to the operator selected conduction angle and the circuit operates in an open loop configuration.

Thus, for example, if the operator selected conduction angle is equal to eighty-five degrees and only seventy-five degrees conduction angle is required to maintain a motor speed of 10,000 RPM, given the present loading of the motor, the control circuit will supply seventy-five degrees conduction angle. Moreover, the control circuit will attempt in this situation to maintain the 10,000 RPM motor speed by increasing the conduction angle as necessary to a maximum of eighty-five degrees—the operator selected conduction angle—before permitting the speed of the motor to decline with increased loading. If, on the other hand, the operator selected conduction angle is greater than 88 degrees, the circuit automatically assumes a complete closed loop configuration and the desired conduction angle is set equal to the full feedback conduction angle.

Once the desired conduction angle has been set, the countdown sequence begins and the triac is fired based on the desired conduction angle. Following the firing of the triac a new kickback limit value is determined for use in the kickback detection algorithm to be discussed below.

Referring now to FIG. 4, the analog input subroutine referenced above will now be described in further detail. The analog input subroutine begins by loading the loop counter, which is used to establish a predetermined time interval for interrogating the analog position of the trigger switch, and by clearing teh threshold counter, used to store a value indicative of the position of the trigger switch. The circuit tests to determine whether the power line voltage is in an odd half cycle or an even half cycle. In the odd half cycle capacitor 36 is charged through rheostat 34 while the predetermined timing loop is executed, each time testing to determine whether the capacitor is above a threshold value of the input/output port. For each pass through the loop during which capacitor 36 is charged above the input threshold, the threshold counter is incremented. Thus the value held in the threshold counter at the end of the odd half cycle loop is indicative of the rate at which capacitor 36 was charged through rheostat 34. Since the charging rate is determined by the analog position of rheostat 34, as set by the operator through the trigger switch, the threshold counter value or charge count is indicative of the desired or operator-selected conduction angle.

Similarly, during each even half cycle capacitor 36 is discharged through rheostat 34 while a similar timing loop determines how long it takes for the capacitor to discharge below the input threshold voltage. This discharge count is then averaged with the previous charge count and the operator selected conduction angle is calculated in accordance with the average value, using a straight line approximation of the form $y=ax+b$, where "y" represents the operator selected conduction angle, "x" represents the average count value previously determined, and "a" and "b" represent scaling constants.

The operator selected conduction angle determined accordingly is then compared with the previously selected conduction angle to determine whether the absolute value of the difference between the two values exceeds a preselected "hysteresis" limit. If not, the analog input subroutine returns to the main program. If the absolute value is above the hysteresis limit, the new operator selected conduction angle, thus determined, replaces the previous operator selected conduction angle and control returns to the main program. The purpose of this procedure is to prevent the tool from "jittering" in response to relatively small changes in the operator selected conduction angle, particularly during full feedback operation of the tool.

FIG. 5 outlines the anti-kickback routine, which begins at the reset entry point of the main program described above in connection with FIG. 3. After preloading the registers and waiting for the power line voltage zero crossing, as described above, the circuit tests to determine whether the trigger switch is on. If the trigger switch is not on, the circuit continues to cycle through the initial presetting steps until the switch is turned on by the operator. Once this has occurred the actual speed of the motor is determined by the speed sensing device such as tachometer 24. In the presently preferred embodiment speed is actually measured as the time interval or period between impulses from the speed sensor. The presently preferred embodiment utilizes a tachometer for its cost saving advantages. However, at low rotational speeds the tachometer produces an output voltage which is insufficient for speed measurements. To avoid erroneous results, the program determines whether the measured speed is below the reliability limits of the tachometer. More precisely, the program determines whether the time period between tachometer impulses is neaq or above the limit of the sensor. If the measured period is near or above the limit the program branches around the anti-kickback detection point and continues as shown. If the rotational speed is sufficient for a reliable tachometer reading, the program tests to determine whether the most recently determined speed period greater than the anti-kickback limit determined on a previous pass through the program. If the latest speed period is greater than the anti-kickback limit, a kickback condition is detected and the program branches to a tra circuit, which performs an endless loop, prohibiting the triac, SCR or other gating device from being triggered. Exit from the endless loop is effected by releasing or turning off the trigger switch, whereupon program control branches to the preset point A near the beginning of the main program.

Following the anti-kickback test the program proceeds to fire the triac or thyristor at the appropriate time, taking into account the fire required for determining the conduction angle. A detailed description of the steps involved was previously given in reference to FIG. 3. After firing has occurred and the desired operating zone selected in accordance with the operator selected conduction angle (as was discussed in connection with FIG. 3), the program determines whether or not open loop low power phase control has been selected. If open loop low power phase control exists, then the operation is forced to occur within the first zone 46 of FIG. 2. If operation is in the first zone, a very high anti-kickback limit value is loaded into the memory address for storing the anti-kickback limit value. This serves to effectively disable the kickback feature during operation of the tool in this low speed mode where low power is being supplied to the motor and consequently kickback is not a problem. If the operation is not within the first zone, the input/output port is interrogated to determine the anti-kickback sensitivity value. This value may be preset at the factory through the selection of the appropriate strap option via option strap arrangement 26. If a "no limit" kickback sensitivity is selected, the anti-kickback limit value is set to a very high value. If other than a "no limit" sensitivity is selected through the option strap arrangement, the input selection read from the input port is converted to a numerical sensitivity value. The rotational period of the motor determined by the tachometer 24 and stored in the speed register is scaled by dividing it by predetermined value. In practice, the speed period, expressed as a binary number, is shifted five digits to the right, which performs a division by 32. The scaled speed period is then multiplied by the sensitivity value, and the product is added to the speed period value. This product is then saved as the new anti-kickback limit for testing against the next speed period to be determined following the next power line voltage zero crossing.

The anti-kickback routine thus utilizes the actual operating speed of the motor in determining when a kickback condition exists. Limits are calculated, using a percentage change technique, against which the actual operating speed is compared for kickback detection. For example, if during a given half cycle the motor is operated at a speed corresponding to 100 forty-microsecond counts, and the anti-kickback factor is set at ten percent, an impending kickback condition will be detected if, on the next half cycle, the actual speed period exceeds a count of 110. If its period is less than 110 counts, a new limit, based upon the measured actual speed period value is calculated and entered and operation continues. Unlike prior art kickback detection schemes which attempt to monitor kickback in terms of rate-of-change of motor current (dI/dt) or rate-of-change of motor speed (ds/dt), the present method detects the kickback condition as a percentage change in motor speed. Thus the present invention does not require current shunt circuitry and analog to digital converter circuitry needed for using the dI/dt technique. Furthermore, the percentage change technique is more accurate at high speeds, unlike prior art ds/dt methods, which are by their nature less able to detect small speed changes at higher operating speeds.

While the above description constitutes the preferred embodiment of the present invention, it will be appreciated that the invention is susceptible to modification, variation and change without departing from the proper scope of fair meaning of the accompanying claims.

What is claimed is:

1. A method of controlling a motor operable over a range of conduction angles comprising the steps of,
   defining a first operating zone corresponding to conduction angles below a predetermined first angle;
   defining a second operating zone corresponding to conduction angles between said first angle and a predetermined second angle greater than said first angle;
   defining a third operating zone corresponding to conduction angles greater than said second angle;
   selecting one of said operating zones and operating said motor according to the following
   (a) for said first zone, operating said motor in an open loop configuration,
   (b) for said second zone, varying the conduction angle in relation to the load, but not exceeding said second angle, to maintain a predetermined speed for conduction angles below said second angle,
   (c) for said third zone, operating said motor in a closed loop configuration.

2. The method of claim 1 further comprising storing said first and second angles, producing a value indicative of a desired operating point within said operating zones, and comparing said value with said first and second angles and selecting one of said operating zones in accordance with said comparison.

3. The method of claim 1 wherein said first angle is determined such that operation of said motor at said first angle produces a no load speed on the order of ten thousand revolutions per minute (10,000 R.P.M.).

4. The method of claim 1 wherein said first angle corresponds to a conduction angle of approximately seventy degrees (70°).

5. The method of claim 1 wherein said second angle corresponds to a conduction angle of approximately eighty-eight degrees (88°).

6. The method of claim 1 wherein the step of operating said motor in a closed loop configuration comprises producing a speed signal having a periodic waveform, the frequency of which being proportional to the speed of said motor, determining the period of said speed signal producing an error signal dependent on said period, and using said error signal to maintain a preselected speed.

7. A method of controlling a motor operable over a range of conduction angles comprising the steps of:
   determining a full feedback conduction angle corresponding to a predetermined motor speed;
   determining an operator selected conduction angle;
   comparing said full feedback conduction angle with said operator selected conduction angle and performing a selected one of the following steps (a) and (b) depending on whether said operator selected conduction angle is greater than or not greater than said full feedback conduction angle:
   (a) if said operator selected conduction angle is greater than said full feedback conduction angle, operating said motor at said full feedback conduction angle;
   (b) if said operator selected conduction angle is not greater than said full feedback conduction angle, operating said motor at said operator selected conduction angle.

8. The method of claim 7 wherein said full feedback conduction angle is determined in accordance with said operator selected conduction angle.

9. The method of claim 7 wherein said full feedback conduction angle is determined by determining a desired speed and determining said full feedback conduction angle in accordance with said desired speed.

10. The method of claim 9 wherein said desired speed is determined in accordance with said operator selected conduction angle.

11. The method of claim 9 wherein said desired speed is determined by comparing said operator selected conduction angle with a predetermined value and performing a selected one of the following steps (c) and (d) depending on whether said operator selected conduction angle is less than or not less than said predetermined value:
    (c) if said operator selected conduction angle is less than said predetermined value, determining said desired speed to be a predetermined constant speed;
    (d) if said operator selected conduction angle is not less than said predetermined value, determining said desired speed to be variable in accordance with said operator selected conduction angle.

12. The method of claim 11 wherein said predetermined value is approximately eighty-eight degrees (88°).

13. The method of claim 11 wherein said predetermined constant speed is approximately ten thousand revolutions per minute (10,000 R.P.M.).

14. The method of claim 11 wherein in step (d) said desired speed is determined as a linear function of said operator selected conduction angle.

15. A method of controlling a motor operable over a range of conduction angles comprising the steps of:
    determining an operator selected conduction angle and a first conduction angle in accordance with said operator selected conduction angle;
    comparing said operator selected conduction angle with a predetermined value and performing a selected one of the following steps (a) and (b) in accordance with whether said operator selected conduction angle is less than or not less than said predetermined value:
    (a) if said operator selected conduction angle is less than said predetermined value and greater than said first conduction angle, operating said motor at said first conduction angle; and if said operator selected conduction angle is less than said predetermined value and not greater than said first conduction angle, operating said motor at said operator selected conduction angle;
    (b) if said operator selected conduction angle is not less than said predetermined value, operating said motor at said first conduction angle.

16. The method of claim 15 wherein said first conduction angle is a full feedback conduction angle corresponding to a predetermined motor speed.

17. The method of claim 15 wherein said first conduction angle is determined by determining a desired speed and determining said first conduction angle in accordance with said desired speed.

18. The method of claim 17 wherein said desired speed is determined in accordance with said operator selected conduction angle.

19. The method of claim 15 wherein said predetermined value is approximately eight-eight degrees (88°).

20. The method of claim 15 wherein said first conduction angle is determined by comparing said operator selected conduction angle with said predetermined value and performing a selected one of the following steps (c) and (d) depending on whether said operator selected conduction angle is less than or not less than said predetermined value:
   (c) if said operator selected conduction angle is less than said predetermined value, determining said desired speed to be a predetermined constant speed;
   (d) if said operator selected conduction angle is not less than said predetermined value, determining said desired speed to be variable in accordance with said operator selected conduction angle.

21. The method of claim 20 wherein said predetermined constant speed is ten thousand revolutions per minute (10,000 R.P.M.).

22. A method of detecting an impending kickback condition in a motor driven tool comprising:
   (a) determining a first value indicative of the rotational period of said motor during a first time interval;
   (b) determining a first limit value based upon a predetermined percentage of said first value;
   (c) determining a second value indicative of the rotational period of said motor during a second time interval; and
   (d) producing a predetermined response if said second value exceeds said first value by at least said first limit value.

23. The method of claim 22 further comprising:
   adding said first limit value to said first value to produce a first test value;
   comparing said first test value with said second value; and
   producing said predetermined response if said second value exceeds said first test value.

24. The method of claim 23 further comprising determining a second test value by determining a second limit value based upon said predetermined percentage of said second value and adding said second limit value to said second value.

25. The method of claim 24 further comprising determining a third value indicative of the rotational period of said motor during a third time interval;
   comparing said second test value with said third value; and
   producing said predetermined response if said third value exceeds said second test value.

26. The method of claim 22 further comprising comparing said first value with a predetermined sensor limit value and disabling said predetermining response if said first value exceeds said sensor limit value.

27. The method of claim 22 further comprising delivering an alternating current to said motor in a succession of half cycles of alternating polarity; and wherein said first value is determined during a first half cycle and said second value is determined during a later half cycle.

28. The method of claim 27 wherein said step of producing a predetermined response is performed at least once during each successive half cycle.

29. The method of claim 22 further comprising determining a kickback sensitivity value and wherein said first value is determined in proportion to said kickback sensitivity value.

30. The method of claim 29 wherein said kickback sensitivity value is determined in accordance with at least one preset conductive path.

31. The method of claim 22 wherein said step of producing a predetermined response includes interrupting the delivery of power to said motor.

32. The method of claim 31 wherein said step of producing a predetermined response further includes waiting for an instruction from the operator of said tool and continuing to interrupt the delivery of power to said motor until said instruction is received.

33. The method of controlling the speed of the motor in a power tool having variable speed selection means that is selectively operable by the operator of the tool, including:
   a first condition wherein said motor is operated in an open loop configuration when said variable speed selection means is below a first predetermined setting which corresponds to a first power level;
   a second condition wherein said motor is operated in a closed loop configuration when said variable speed selection means is above a second predetermined setting which corresponds to a second power level greater than said first power level; and
   a third condition wherein said motor is operated at a power level between said first and second power levels when said variable speed selection means is above said first predetermined setting and below said second predetermined setting.

34. The method of claim 33 wherein in said third condition, the power level of the motor is varied between said first power level to a maximum of said second power level in accordance with variations in the load applied to the motor in order to maintain the speed of the motor substantially at a predetermined speed approximately equal to the no load speed of the motor at said first power level.

35. The method of controlling the speed of the motor in a power tool having a variable speed selection means that is selectively operable by the operator of the tool, including:
   operating said motor in a first condition in an open loop configuration when said variable speed selection means is below a first setting corresponding to a first power level; and
   operating said motor in a second condition when said variable speed selection means is above said first setting by varying the power level of the motor between said first power level to a maximum of a second power level greater than said first power level in accordance with variations in the load applied to the motor to maintain the speed of the motor substantially at a predetermined speed approximately equal to the no load speed of the motor at said first power level.

36. The method of claim 35 wherein in said second condition, the setting of said variable speed selection means corresponds to said second power level.

37. The method of controlling the speed of the motor in a power tool having variable speed selection means that is selectively operable by the operator of the tool, including:
- operating said motor in an open loop configuration when said variable speed selection means is below a first setting corresponding to a first power level; and
- operating said motor in a closed loop configuration when said variable speed selection means is at a second setting corresponding to a second power level greater than said first power level.

38. The method of claim 37 further including operating said motor so as to maintain the speed of said motor substantially constant at the speed corresponding approximately to the no load speed of the motor at said first power level when said variable speed selection means is between said first and second settings by varying the power of the motor between said first and second power levels in accordance with the load applied to the motor.

39. The method of controlling the speed of the motor in a power tool having variable speed selection means that is selectively operable by the operator of the tool, including:
- operating said motor in an open loop configuration when said variable speed selection means is below a first setting corresponding to a first power level; and
- operating said motor in a closed loop configuration wherein the setting of said variable speed selection means corresponds to a desired motor speed greater than the approximate no load speed of the motor at said first power level such that the power level of the motor is varied in accordance with the load applied to the motor to substantially maintain said desired speed.

* * * * *

UNITED STATES PATENT AND TRADEMARK OFFICE
CERTIFICATE OF CORRECTION

PATENT NO. : 4,628,233 (Page 1 of 2)

DATED : December 9, 1986

INVENTOR(S) : Robert Bradus

It is certified that error appears in the above-identified patent and that said Letters Patent is hereby corrected as shown below:

Column 1, line 33, "condition" (second occurrence) should be --conduction--.

Column 7, lines 46, 47, "aproximately" should be --approximately--.

Column 8, line 62, "corresponds" should be --correspond--.

Column 9, line 45, "if" (second occurrence) should be --it--.

Column 11, line 1, "teh" should be --the--.

Column 11, line 67, "neaq" should be --near--.

Column 12, line 5, after "period", insert --is--.

Column 12, line 9, "tra" should be --trap--.

Column 12, line 17, "fire" should be --time--.

Column 13, line 15, "of" should be --or--.

UNITED STATES PATENT AND TRADEMARK OFFICE
CERTIFICATE OF CORRECTION

PATENT NO. : 4,628,233  (Page 2 of 2)

DATED : December 9, 1986

INVENTOR(S) : Robert Bradus

It is certified that error appears in the above-identified patent and that said Letters Patent is hereby corrected as shown below:

Column 13, line 28, claim 1, after "following", insert --:--.

Column 15, line 65, claim 26, "predetermining" should be --predetermined--.

Signed and Sealed this

Twenty-second Day of September, 1987

Attest:

DONALD J. QUIGG

Attesting Officer     Commissioner of Patents and Trademarks